(No Model.)
J. W. LANG.
CAR COUPLING.
No. 519,022. Patented May 1, 1894.
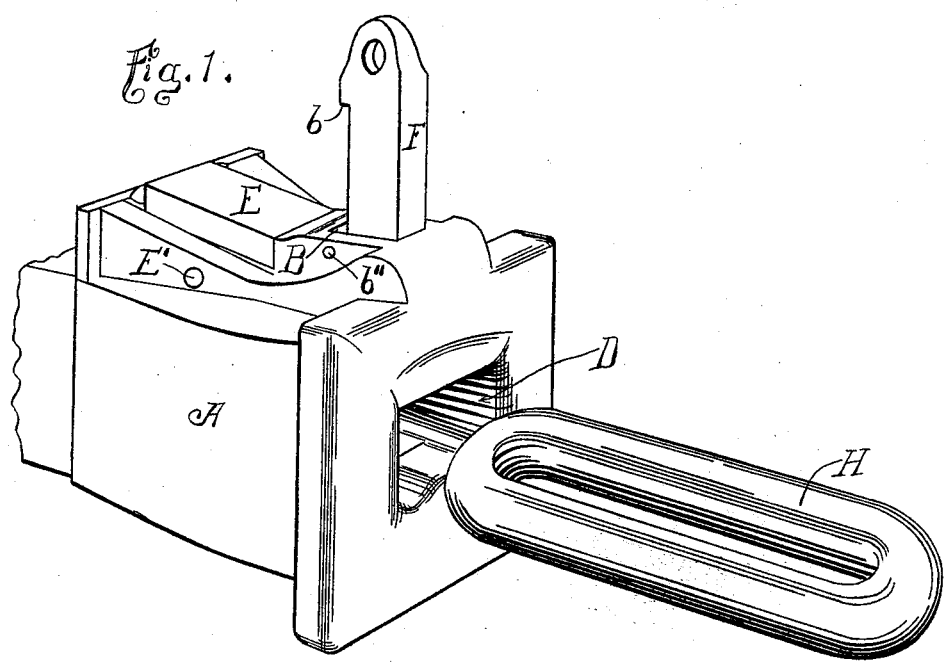
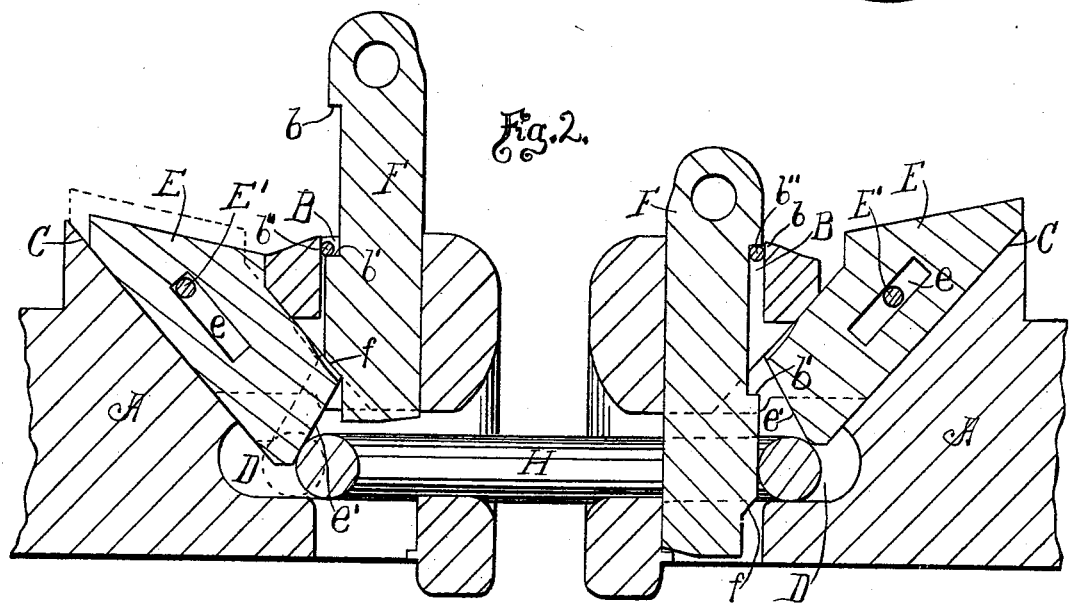
Witnesses.
P. W. Harbeson.
F. M. Townsend.
Inventor.
John W. Lang
by Hazard & Townsend
his attys.

UNITED STATES PATENT OFFICE.

JOHN W. LANG, OF LOS ANGELES, CALIFORNIA.

CAR-COUPLING.

SPECIFICATION forming part of Letters Patent No. 519,022, dated May 1, 1894.

Application filed June 5, 1893. Serial No. 476,564. (No model.)

*To all whom it may concern:*

Be it known that I, JOHN W. LANG, a citizen of the United States, residing at Los Angeles, in the county of Los Angeles and State of California, have invented a new and useful Improvement in Car-Couplings, of which the following is a specification.

The object of my invention is to produce a cheap, simple, durable and efficient automatic coupling suitable for coupling freight cars, and one which will be adapted for use with an ordinary link and pin coupling, with which most freight cars are provided.

My invention consists essentially of a draw-head provided with a pin hole, and also provided at the rear of its throat with a rearwardly inclined link-and-pin-support guideway; a weighted pin-and-link-support arranged in such guideway and having its lower end arranged to project into the pin hole and into the throat of the draw-head when the support is in its lowest position, and to rest upon the link when the link is in position in the draw-head and the end of the support is retracted from the pin hole; a pin arranged in the pin hole and provided upon its rear face with a shoulder adapted to be engaged by the weighted pin support when the pin is in its elevated position, to thereby support the pin, all so arranged and proportioned that when the link is forced into the draw-head it will engage the pin support and retract it from the pin hole.

My invention also comprises a draw-head provided with a vertical pin hole, and provided at the rear of such pin hole with an inclined guideway opening upward and backward from the rear end of the throat of the draw-head; a weighted pin support arranged in such inclined guideway and having its lower end arranged to project into the pin hole to support the pin when the pin is raised, and to also project into the path of the link; the pin arranged in the pin hole; all so arranged and proportioned that when the link is forced into the throat of the draw-head it will engage with the end of the pin support and slide such support upward and backward in the inclined guideway, to thereby retract the end of the pin support from the pin hole.

The accompanying drawings illustrate my invention.

Figure 1 is a perspective side elevation of a draw-head embodying my invention, and with the link in the act of entering the draw-head. Fig. 2 is a longitudinal midsection of two draw-heads constructed according to my invention, showing one of the draw-heads with the pin in its elevated position, and the other draw-head with the pin in its lowered position.

In the drawings, A is a draw-head which is provided with a vertical angular pin hole B and is provided at the rear of the pin hole with an angular guideway C arranged opening upward and backward from the rear end of the throat D of the draw-head at an angle of about forty-five degrees with the pin hole.

E is an angular weighted pin and link support which is provided with a longitudinal slot $e$ and is arranged to slide in the guideway, and has its lower end $e'$ arranged to project into the pin hole to support the pin above the throat of the draw-head, and to also project into the path of the link as shown in a draw-head at the left of Fig. 2.

F is an angular pin which is arranged in an angular pin hole B, and is provided on its rear face with an upwardly sloping shoulder $f$ having its face arranged in an angle corresponding to the angle of the guideway and adapted to be engaged by the lower end of the pin support when the support is in its lowest position and the pin is raised, to thereby support the pin. This pin is also provided on its rear face with two pin retaining shoulders $b$ $b'$ arranged to allow the pin to be reciprocated in the pin hole and to engage with a transverse bolt $b''$ through the draw-head at the rear of the pin to prevent the removal of the pin from the draw-head.

E' is a bolt passed through the draw-head and through the longitudinal slot $e$ in the weighted pin support E, and arranged to allow the pin support to be reciprocated in the guideway, but to prevent its withdrawal from such guideway until the bolt is removed.

In operation, the pin is elevated as indicated in Fig. 1 and also at the left hand side of Fig. 2, and the weighted pin support E slides down in the guideway C and engages with the supporting shoulder $f$ of the pin, to thereby support the pin above the throat of the draw-head. When the link H is forced into the throat of the draw-head as shown at the left of Fig. 2, it pushes against the lower end of the pin support and slides the pin support upward in the guideway C as indicated in dotted lines at the left of Fig. 2, and the pin drops down through the link to engage therewith as shown at the right of Fig. 2. The pin support E is of sufficient weight to rest upon the end of the link H and hold the link end of the link elevated, whereby it is guided into the opposing draw-head when the cars are coupled. This action of the support is illustrated at the right of Fig. 2, where the support is shown resting upon the link. The link is free to move downward if force is applied to the end of the link, the pin support E simply sliding upward in the guideway C until the pressure is removed, when it forces the link back into its normal position.

My invention while being cheap and simple, is also composed of few parts and those not liable to become broken; there are no springs or joints to get out of order to render the coupling inoperative. In case an ordinary pin and link draw-head should become broken upon a car, one of my improved draw-heads may be inserted in the place of such broken draw-head and will operate equally as well with an ordinary pin and link draw-head as such draw-heads will with each other.

Now, having described my invention, what I claim as new, and desire to secure by Letters Patent, is—

1. In a car coupling, the draw-head provided with the vertical pin hole, and provided at the rear of such pin hole with an inclined guideway opening upward and backward from the rear end of the throat of the draw-head; a weighted pin support provided with a longitudinal slot and arranged in such inclined guideway, and having its lower end arranged to project into the pin hole to support the pin when the pin is raised and to also project into the path of the link; a pin arranged in the pin hole and provided with an upwardly sloping shoulder having its face arranged in an angle corresponding to the angle of the guideway, and adapted to be engaged by the lower end of the pin support when the pin support is in its lowest position and the pin is raised, such pin being also provided with two bolt engaging shoulders arranged to allow the pin to be reciprocated in the pin hole: the pin retaining bolt inserted through the drawhead and arranged to engage the bolt engaging shoulders upon the pin to prevent the removal of the pin from the drawhead, and the pin support retaining bolt passed through the drawhead and through the longitudinal slot in the pin support.

2. In a car coupling the draw-head provided with an angular vertical pin hole, and provided at the rear of such pin hole with an angular inclined guideway opening upward and backward from the rear end of the throat of the draw-head; an angular weighted pin support provided with a longitudinal slot and arranged in such inclined guideway, and having its lower end arranged to project into the pin hole to support the pin when the pin is raised, and to also project into the path of the link; an angular pin arranged in the angular pin hole and provided upon its rear face with an upwardly sloping shoulder having its face arranged in an angle corresponding to the angle of the guideway, and adapted to be engaged by the lower end of the pin support when the pin support is in its lowest position and the pin is raised, to thereby support the pin, such pin being also provided with two bolt engaging shoulders arranged to allow the pin to be reciprocated in the pin hole and to engage with a transverse pin retaining bolt inserted through the draw-head at the rear of the pin to prevent the removal of the pin from the draw-head; such pin retaining bolt arranged in the draw-head, and a pin support retaining bolt passed through the draw-head and through the longitudinal slot in the weighted pin support; all so arranged and proportioned, that when the link is forced into the throat of the draw-head it will engage with the end of the pin support and slide such support upward and backward in the inclined guideway to thereby retract the end of the pin support from the pin hole.

JOHN W. LANG.

Witnesses:
ALFRED I. TOWNSEND,
F. M. TOWNSEND.